(12) United States Patent
Falkenberg

(10) Patent No.: US 6,695,486 B1
(45) Date of Patent: Feb. 24, 2004

(54) ANGLED FIBER OPTIC CONNECTOR

(75) Inventor: Dean Falkenberg, Windsor, CA (US)

(73) Assignee: Cisco Technology, INC, San Jose, CA (US)

( * ) Notice: Subject to any disclaimer, the term of this patent is extended or adjusted under 35 U.S.C. 154(b) by 0 days.

(21) Appl. No.: 09/431,337

(22) Filed: Oct. 29, 1999

(51) Int. Cl.[7] ................................................. G02B 6/38
(52) U.S. Cl. ............................ 385/59; 385/71; 385/139
(58) Field of Search ............................. 385/53, 54, 55, 385/59, 60, 70, 71, 72, 78, 81, 139; 359/32, 134, 135, 136, 137, 138

(56) References Cited

U.S. PATENT DOCUMENTS

| | | | | |
|---|---|---|---|---|
| 3,933,409 A | * | 1/1976 | Kloots | 385/45 |
| 4,737,004 A | * | 4/1988 | Amitay et al. | 385/43 |
| 5,073,044 A | | 12/1991 | Egner et al. | 385/86 |
| 5,115,260 A | | 5/1992 | Hayward et al. | 385/100 |
| 5,138,676 A | | 8/1992 | Stowe et al. | 385/32 |
| 5,138,678 A | | 8/1992 | Briggs et al. | 385/86 |
| 5,179,617 A | * | 1/1993 | Stockman | 385/136 |
| 5,218,657 A | * | 6/1993 | Tokudome et al. | 385/139 |
| 5,233,677 A | | 8/1993 | Winslow | 385/89 |
| 5,329,603 A | | 7/1994 | Watanabe et al. | 385/86 |
| 5,355,429 A | * | 10/1994 | Lee et al. | 385/136 |
| 5,521,998 A | * | 5/1996 | Walles et al. | 385/138 |
| 5,757,997 A | | 5/1998 | Birrell et al. | 385/60 |
| 5,781,681 A | | 7/1998 | Manning | 385/86 |
| 5,892,870 A | * | 4/1999 | Fingler et al. | 385/59 |
| 5,923,802 A | * | 7/1999 | Giebel et al. | 385/134 |
| 6,290,399 B1 | * | 9/2001 | Ogiya | 174/70 S |

* cited by examiner

Primary Examiner—Mark A. Robinson
(74) Attorney, Agent, or Firm—Ritter, Lang & Kaplan LLP

(57) ABSTRACT

A fiber optic connector module is presented that has one or more male fiber optic connectors on one end of an angled molded body and a corresponding number of female optical connectors on the other end. The molded body can be a fixed angle module made of a material such as plastic, or can be an adjustable angle module where the angle can be adjusted to from 90 and 180 degrees. The connector module prevents problems associated with optoelectronic equipment that is rack mounted and has vertically mounted optical interfaces, such as microbending of the optical fiber. Moreover, the connector module ensures that safety requirements, and in particular the elimination of eye-level laser exposure, are met.

10 Claims, 3 Drawing Sheets

ANGLED FIBER OPTIC CONNECTOR

BACKGROUND OF THE INVENTION

The use of optical fibers for the transmission of voice, data, and video information has increased dramatically in recent years. The heart of such transmission systems is an optical fiber of silica glass or other suitable material that has been clad with an appropriate material to create a waveguide along which light energy can travel in a controlled manner. Optical fibers are extremely small (in the order of microns in diameter) and when they are incorporated into a transmission system it is necessary to effect interconnections between separate lengths of such fibers, or between fiber and active transmitters or receivers.

With the greatly expanding deployment of optical fiber transmission systems and the continual miniaturization of electronics, it has become increasingly necessary to provide a higher density of optical cable connections to optoelectronic transmission equipment.

Since most optoelectronic equipment is rack mounted, traditional fiber optic cable connections to optoelectronic equipment has been to the equipment's vertically mounted front panel, or faceplate. FIG. 1 illustrates the prior art for vertically mounted optical interfaces on the faceplate of optoelectronic equipment. FIG. 1 illustrates a side view of a printed circuit board (PCB) 100 containing a multitude of duplex optical interfaces mounted on the PCB faceplate 104. A duplex optical bulkhead connector 105 connects to a PCB transmitter 101 and a PCB receiver 102 via optical fibers 103. A duplex transmitter/receiver module with an integrated bulkhead connector 110 is also shown in FIG. 1 as an alternative optical interface. Other optical interfaces, such as simplex optical bulkhead connectors, are also widely used. The term optical interface is being used to generically describe any of the above optical bulkhead connectors to the PCB 100, as well as other types of optical connectors.

To maximize the useable real estate on the PCB 100, manufacturers commonly mount the optical interface bulkhead connectors 105 or the integrated bulkhead connectors 110 in a vertical configuration, as illustrated in FIG. 1. However, as a result of utilizing the vertical optical interface bulkhead connectors 105 or the integrated bulkhead connectors 110, end users may be exposed to safety issues due to high power lasers at eye level.

Additionally, the natural gravitational affects on fiber optic jumper cables 130 connected to the vertical optical interface bulkhead connectors 105 or the integrated bulkhead connectors 110 can cause microbending losses in the fiber optic jumper cables 130, as depicted by the sharp angle 140 shown in FIG. 1.

Historically, to prevent such microbending, manufacturers of fiber optic jumper cables 130, produce right angle strain relief devices (not illustrated) that attach to the fiber optic jumper cable 130 in the area next to a fiber optic connector 120 which is the area most susceptible to the gravitationally induced sharp angle 140. These right angle strain relief devices are specifically designed for each manufacturer of and type of fiber optic connector 120. Consequently, end users (e.g., telecommunications companies) that use multiple suppliers of optical fiber jumper cables 130, must also keep vendor specific right angle strain relief devices. This is an expense and inconvenience the end user would much prefer to avoid.

To eliminate this right angle strain relief device cost to the end user, some manufacturers cut the PCB 100 in order to angle the optical interface bulkhead connector 105 or the integrated bulkhead connector 110 downward, thereby avoiding the fiber optic jumper cable 130 microbending. This technique, however, results in increased design and manufacturing costs for the PCB 100, and lost PCB 100 real estate.

For this reason there is a need for a fiber optic connector module which can connect to a vertically mounted faceplate and angle downward to eliminate the gravitation microbending effect on an attached generic fiber optic jumper.

SUMMARY OF THE INVENTION

A fiber optic connector module is presented that has one or more male fiber optic connectors on one end of a molded body and a corresponding number of female optical connectors on the other end. The molded body can be a fixed angle module made of a material such as plastic, or can be an adjustable angle module where the angle can be adjusted to an angle between 90 degrees and less than 180 degrees.

In one embodiment, the male connector is connected to the female connector with an optical fiber terminated with optical ferrules enclosed within the molded body. Alternative embodiments utilize various passive optical devices to interconnect the male and female connects, such as optical splitters, wave division multiplexers, and optical attenuators. Alternative embodiments substitute a bulkhead connector for the male connector(s) to allow for direct mounting to the optoelectronic equipment faceplate.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DETAILED DESCRIPTION OF THE PREFERRED EMBODIMENT

Figure 1:
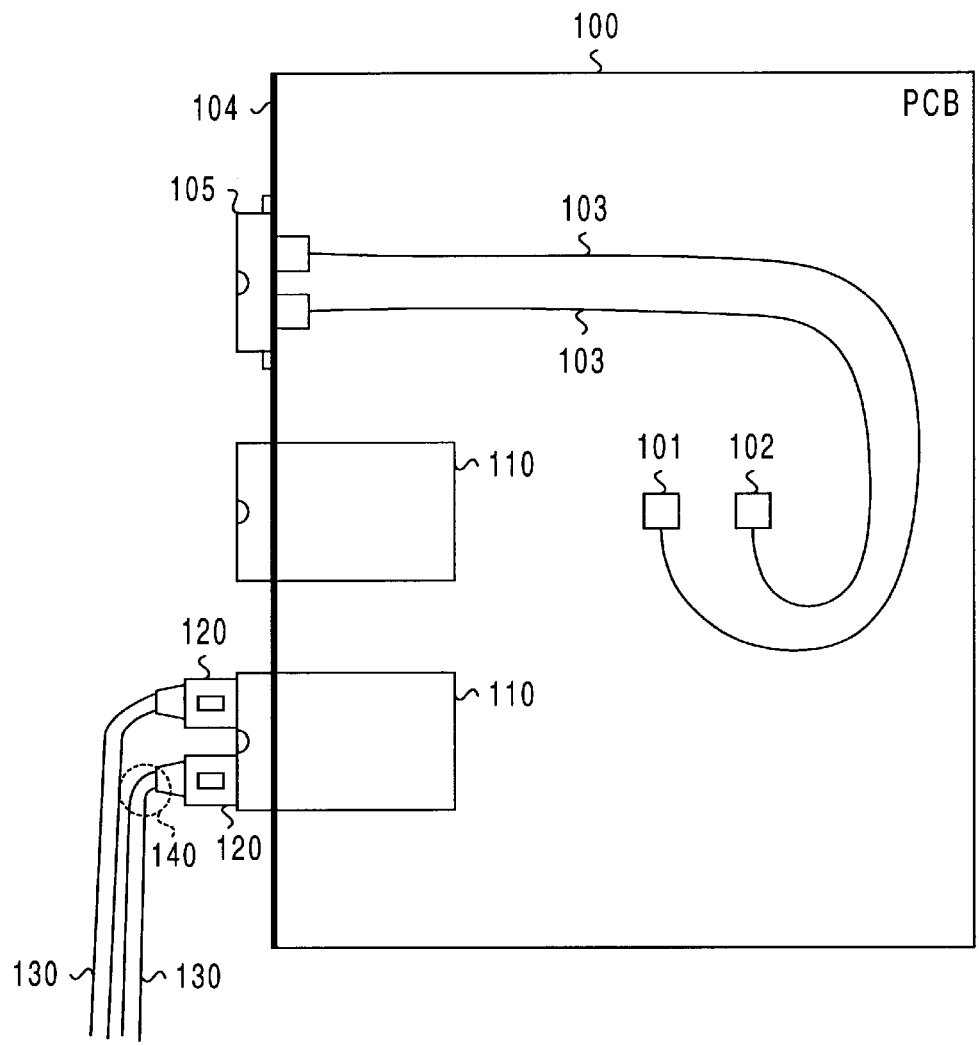
FIG. 1 illustrates the prior art for an optical fiber connection to a printed circuit board having a vertically mounted fiber optic interface.
Figure 2:
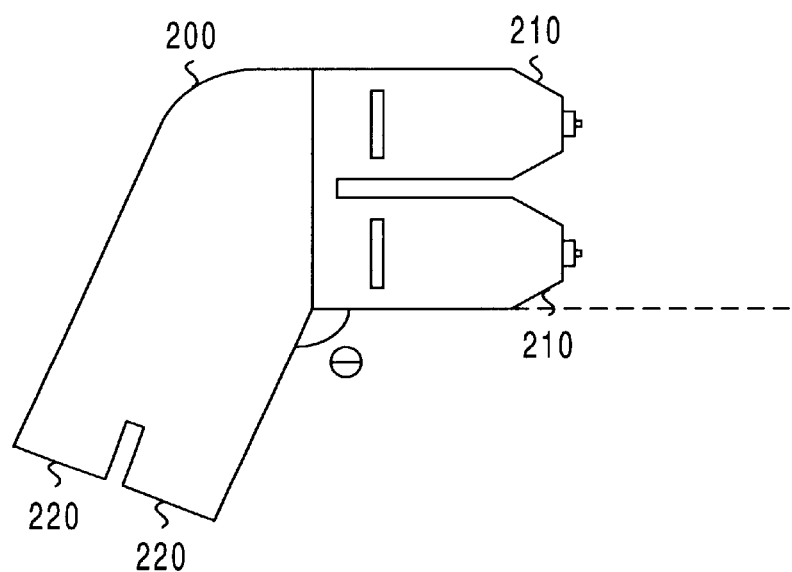
FIG. 2 illustrates one embodiment of a two fiber angled fiber optic connector module.

FIG. 2 illustrates one embodiment of the present invention which simultaneously allows PCB 100 manufacturers to design vertically mounted optical interface bulkhead connectors 105 and integrated bulkhead connectors 110 while eliminating end user issues created by such a configuration. As shown in FIG. 2, the illustrated embodiment is a duplex module 200 that is a molded body having a male duplex connector 210 at one end for interfacing to the vertically mounted duplex optical interface bulkhead connector 105 or the integrated bulkhead connector 110 on the equipment faceplate 104, and a female duplex connector 220 at the other end for interfacing to the standard optical fiber jumper cables 130. The angle of the duplex module 200, as measured between the male duplex connector 210 and the female duplex connector 220, represented by the angle θ, is an angle between 90 degrees and 180 degrees, but is typically between 120 degrees and 150 degrees.

Using standard male fiber optic connectors 210 and female fiber optic connectors 220, the duplex module 200 of FIG. 2 is approximately 1.25 inches high by 2 inches wide. If the module is implemented with miniature duplex connectors, the duplex module 200 may be as small as 1 inch by 1 inch. The actual dimensions are dependent on a number of factors, such as the angle of the module 200 and the number and type of connectors.

Figure 3:
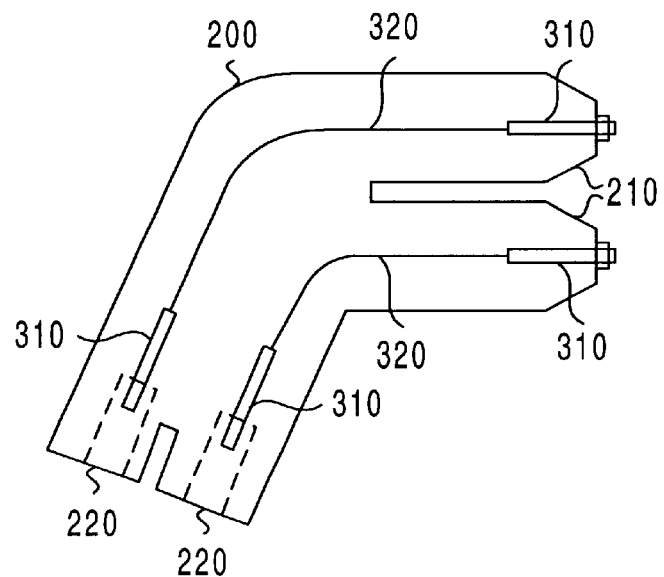
FIG. 3 illustrates an internal cross-section of the two fiber angled fiber optic connector module of FIG. 2.

FIG. 3 illustrates an internal horizontal cross-section of the embodiment of FIG. 2. Internal to the module 200, each male fiber optic connector 210 is connected to an associated female optical connector 220 by optical fiber 320 terminated on both ends with optical ferrules 310. The ferrule-optical fiber-ferrule assembly is manufactured using techniques well known to those in the art and include the polishing of the ends of the ferrules 310 using standard optical connector polishing techniques. The ferrule-optical fiber-ferrule assembly is then inserted into the module 200 before sealing the module 200.

In one embodiment two molded halves are formed. The halves can be symmetrical, or one piece may act as a lid or cover. Alternatively, an asymmetric design can be used in which one piece may have sides which are longer than the other. Any number of plastic materials can be utilized, and plastics having the appropriate thermal, flammability and other characteristics are readily available and well known to those skilled in the art.

For assembly, the ferrule-optical fiber-ferrule assemblies are placed in one half. A sealant can be used to hold the optical fiber 320 in place, maintain the bending radius, and seal the optical fiber 320 from contaminants. Alternatively, a molded structure can be part of the body to hold the optical fiber 320 in place.

The remaining half is mated with the first half. A number of mechanisms can be used to seal the package including sealing using adhesive, use of screws or other mechanical device, or a snap fit design. The sealing can be made permanent by using adhesive, plastic welding, ultrasonic bonding, or other sealing techniques.

Alternative materials and assembly techniques are also possible which will be apparent to those skilled in the art and clearly fall within the scope of the invention.

Figure 4:
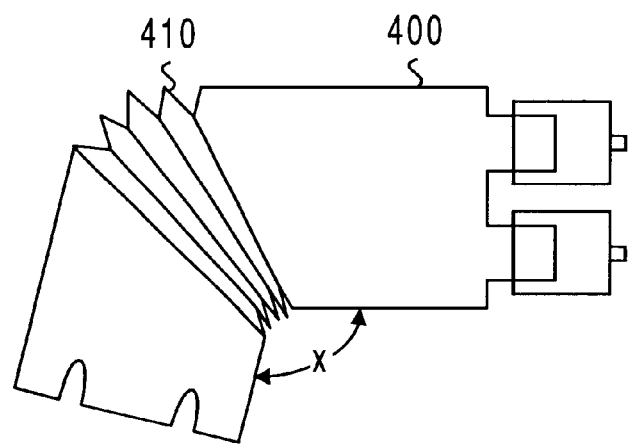
FIG. 4 illustrates one embodiment of an adjustable angle fiber optic connector module.

FIG. 2 and FIG. 3 depict the module 200 having a fixed angle molded body. FIG. 4 illustrates a variable angle module 400 having an accordion structure 410 which allows the angle to be adjusted. The accordion structure 410 is typically a pliable plastic material, which may contain rubber or other elastic material.

Figure 5:
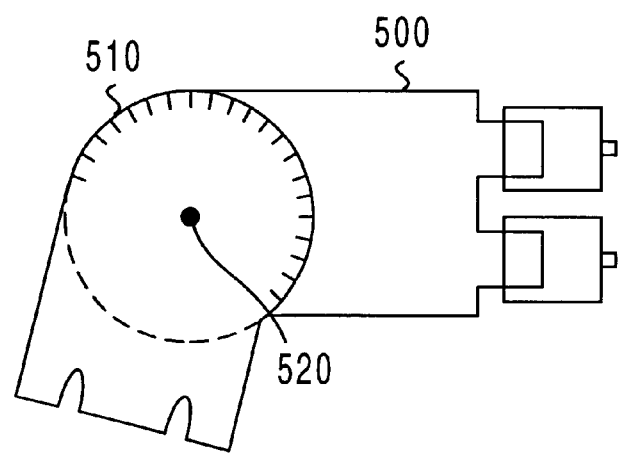
FIG. 5 illustrates one embodiment of an adjustable angle fiber optic connector module.

FIG. 5 illustrates a variable angle module 500 which is constructed using a rotating structure 510 with a center axis 520. In one embodiment a pressure based ratchet device is used in which two faces of the rotating structure have interleaved angled edges which permit adjusting but which hold the unit fixed while not being adjusted. The center axis can be a stainless steel pin, screw, or other mechanical device.

An additional alternative embodiment includes substituting a bulkhead connector interface 105 for the male optical connectors 210 of FIG. 2. In this embodiment, the optic fiber and ferrule assembly would terminate into female fiber optic connectors 220 on both ends of the module 200 with one end being able to be mounted on the faceplate 104 of the PCB 100.

Another alternative embodiment includes the use of a passive fiber optic splitter, wave division multiplexer, or an optical attenuator as a substitute for the optical fiber 320 of FIG. 3. In the case of fiber optic splitter—sometimes known as a fiber optic coupler—and the wave division multiplexer, only one female optical connector 220 is required on the duplex module 200. Passive optical splitters and wave division multiplexers that can be used include fused biconic taper or waveguide based devices. Other technologies, such as planar waveguides or silica on silicon may also be used.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A fiber optic module, comprising:
    a single male fiber optic connector;
    a single female fiber optic connector; and
    a body connecting the single male fiber optic connector to the single female fiber optic connector such that the single male fiber optic connector and the single female fiber optic connector form a fixed angle of between 90 degrees and 180 degrees with an optical connection fixed in the body against movement in all directions.

2. The module of claim 1, wherein the male fiber optic connector includes a plurality of male fiber optic connectors, the female fiber optic connectors includes an equal plurality of female fiber optic connectors, and each male fiber optic connector is optically coupled to a corresponding female fiber optic connector.

3. The module of claim 1, wherein the male fiber optic connector and the female fiber optic connector are connected by an optical fiber.

4. The module of claim 1, wherein the male fiber optic connector includes at least two male connectors, and the at least two male fiber optic connectors are internally connected to the female fiber optic connector by a fiber optic splitter.

5. The module of claim 1, wherein the male fiber optic connector includes dual male fiber optic connectors, and the dual male fiber optic connectors are internally connected to the female fiber optic connector by a fiber optic wavelength division multiplexer.

6. The module of claim 1, wherein the male fiber optic connector includes dual male fiber optic connectors, and the dual male fiber optic connectors are internally connected to the female fiber optic connector by a fiber optic attenuator.

7. The module of claim 1, wherein the female fiber optic connector includes a plurality of female fiber optic connectors, the bulkhead fiber optic connector includes one or more bulkhead fiber optic connectors, and each of the plurality of female fiber optic connectors are connected directly to a corresponding port on the one or more bulkhead connectors.

8. The module of claim 1, wherein the bulkhead fiber optic connector includes a dual port bulkhead fiber optic connector, and the bulkhead fiber optic connector ports are internally connected to the female connector by a fiber optic splitter.

9. The module of claim 1, wherein the bulkhead fiber optic connector includes a dual port bulkhead fiber optic connector, and the bulkhead fiber optic connector ports are internally connected to the female connector by a fiber optic wavelength division multiplexer.

10. The module of claim 1, wherein the bulkhead fiber optic connector includes a dual port bulkhead fiber optic connector, and the bulkhead fiber optic connector ports are internally connected to the female connector by a fiber optic attenuator.

* * * * *